US010179407B2

(12) United States Patent
Benaim (10) Patent No.: US 10,179,407 B2
(45) Date of Patent: Jan. 15, 2019

(54) DYNAMIC MULTI-SENSOR AND MULTI-ROBOT INTERFACE SYSTEM

(71) Applicant: Carlos Benaim, Binyamina (IL)

(72) Inventor: Carlos Benaim, Binyamina (IL)

(73) Assignee: ROBOLOGICS LTD., Binyamina (IL)

( * ) Notice: Subject to any disclaimer, the term of this patent is extended or adjusted under 35 U.S.C. 154(b) by 307 days.

(21) Appl. No.: 14/941,879

(22) Filed: Nov. 16, 2015

(65) Prior Publication Data
US 2017/0136621 A1 May 18, 2017

(51) Int. Cl.
| | |
|---|---|
| *B25J 9/16* | (2006.01) |
| *B25J 13/00* | (2006.01) |
| *G06F 3/01* | (2006.01) |
| *G06F 3/0484* | (2013.01) |

(52) U.S. Cl.
CPC ............ *B25J 9/1692* (2013.01); *B25J 13/00* (2013.01); *G06F 3/011* (2013.01); *G06F 3/013* (2013.01); *G06F 3/015* (2013.01); *G06F 3/0484* (2013.01); *B25J 9/1697* (2013.01); *G05B 2219/35503* (2013.01); *Y10S 901/09* (2013.01); *Y10S 901/16* (2013.01)

(58) Field of Classification Search
CPC .......................................... G05B 2219/39022
See application file for complete search history.

(56) References Cited

U.S. PATENT DOCUMENTS

| | | | | |
|---|---|---|---|---|
| 6,408,226 B1 * | 6/2002 | Byrne | ................. | G05D 1/0246 318/568.11 |
| 6,687,571 B1 * | 2/2004 | Byrne | ................. | G05D 1/0289 700/225 |
| 6,724,930 B1 * | 4/2004 | Kosaka | ............... | G01B 11/002 382/154 |
| 9,211,643 B1 * | 12/2015 | Shirakyan | ............. | B25J 9/1697 |
| 9,884,425 B2 * | 2/2018 | Yamaguchi | ............ | B25J 9/1697 |
| 2006/0258938 A1 * | 11/2006 | Hoffman | ........... | A61B 1/00193 600/424 |

(Continued)

FOREIGN PATENT DOCUMENTS

| | | | | |
|---|---|---|---|---|
| EP | 2070664 A1 * | 6/2009 | ............ | B25J 9/1692 |
| WO | WO-2013173749 A1 * | 11/2013 | ............... | G06T 5/10 |
| WO | WO-2014161603 A1 * | 10/2014 | ............ | B25J 9/1692 |

*Primary Examiner* — Ruth Ilan (57) ABSTRACT

An adaptive learning interface system for end-users for controlling one or more machines or robots to perform a given task, combining identification of gaze patterns, EEG channel's signal patterns, voice commands and/or touch commands. The output streams of these sensors are analyzed by the processing unit in order to detect one or more patterns that are translated into one or more commands to the robot, to the processing unit or to other devices. A pattern learning mechanism is implemented by keeping immediate history of outputs collected from those sensors, analyzing their individual behavior and analyzing time correlation between patterns recognized from each of the sensors. Prediction of patterns or combination of patterns is enabled by analyzing partial history of sensors' outputs. A method for defining a common coordinate system between robots and sensors in a given environment, and therefore dynamically calibrating these sensors and devices, is used to share characteristics and positions of each object detected on the scene.

8 Claims, 7 Drawing Sheets

(56) References Cited

U.S. PATENT DOCUMENTS

| | | | |
|---|---|---|---|
| 2007/0024614 A1* | 2/2007 | Tam | H04N 13/026 345/419 |
| 2011/0280472 A1* | 11/2011 | Wallack | B25J 9/1692 382/153 |
| 2013/0010081 A1* | 1/2013 | Tenney | G05B 19/4086 348/47 |
| 2013/0179162 A1* | 7/2013 | Merschon | G06F 3/0304 704/231 |
| 2013/0226344 A1* | 8/2013 | Wong | G05D 1/024 700/258 |
| 2014/0012415 A1* | 1/2014 | Benaim | G06K 9/00355 700/248 |
| 2014/0188274 A1* | 7/2014 | Namiki | B25J 9/1692 700/254 |
| 2014/0288710 A1* | 9/2014 | Ikenaga | B25J 9/1697 700/259 |
| 2015/0025683 A1* | 1/2015 | Amano | B25J 9/1692 700/254 |
| 2015/0127153 A1* | 5/2015 | Yamaguchi | B25J 9/1692 700/254 |
| 2015/0224649 A1* | 8/2015 | Watanabe | B25J 9/1607 700/259 |
| 2015/0258688 A1* | 9/2015 | Suzumura | B25J 9/1692 700/254 |
| 2016/0151915 A1* | 6/2016 | Nishi | B25J 9/1692 700/247 |
| 2016/0279800 A1* | 9/2016 | Onda | B25J 9/1697 |
| 2016/0354929 A1* | 12/2016 | Ishige | B25J 9/1697 |
| 2016/0379370 A1* | 12/2016 | Nakazato | G06K 9/4604 382/103 |
| 2017/0066131 A1* | 3/2017 | Kamikawa | B25J 9/1692 |
| 2017/0352192 A1* | 12/2017 | Petrovskaya | G06T 7/77 |

* cited by examiner

DYNAMIC MULTI-SENSOR AND MULTI-ROBOT INTERFACE SYSTEM

CROSS REFERENCE

This application claims the benefit of U.S. Provisional Patent Application No. 62/080,353 filed on Nov. 16, 2014 and entitled Dynamic Multi-Sensor and Multi-Robot Learning Interface System.

TECHNICAL FIELD

The present invention pertains to adaptive learning interface system for controlling and operating robotic devices. More particularly the present invention pertains to such controlling and operating of robotic devices with human produced signals.

FIELD AND BACKGROUND OF THE INVENTION

The present invention, in some embodiments thereof, relates to a dynamic multi-sensor and multi-machine calibration method.

Computer and robotic applications that include some level of interaction with the physical environment, require estimating and sharing the 2D or 3D coordinates of objects detected in the given environment. When more than one sensor or actuator is involved, it's critical to have these coordinates translated to a relative position with respect to the receiving device or sensor. For example, if an object is detected after analysing an output image from a depth sensor, in order to have a robot grasp this object, those coordinates must be translated to a relative position with respect to the robot itself as opposed to the camera that detected it. When multiple sensors and robots are combined, obtaining these equivalent coordinates becomes very complex.

Many industrial applications of robotic machines include robotic machines working together as a robotic team. These teams of robotic machines include machines of multiple designs, manufacturers and generations and are many times assisted by external sensors to determine the location of objects in the environment. In order to have each machine understand where a given object is located, the objects' coordinates must be converted to a relative position with regards to of the participating machines. In static environments such as the industrial one described, this requires some setup effort to determine the relative position of each sensor and robot in the system with respect to each other. After this initial effort and considering that the base of the robots and the sensors are in a fixed position, the initial data is used to make the required calculations for sharing coordinate data between robots and sensors.

In a less static environment, an initial setup effort to estimate these relative positions is not enough as both robots' bases and sensors might change positions in an untraceable way, and therefore the relative positions between them will not always be the same.

While requiring setup effort, there are many methods to translate coordinates between devices in the static scenario described above. For a dynamically changing scenario, where sensors and robots change their relative position with regards to each other, the problem is more complicated and there are no practical and dynamical methods available that solve this in a simple and timely manner.

In other embodiments of the current invention, the methods described above are used as a system to assist physically impaired patients who can demand actions from a robot combining one or more gesture mechanisms: Eye gaze, voice, gestures, EEG signals, touch, and others. A robot is set to assist a paralyzed or weak patient in manipulating or picking objects around a scene. A method is defined to enable such patients to control a robotic arm through gaze. A camera pointed towards an end-user's eye is able to track the direction the pupil is directed to while one or more external sensors is able to detect the object in the scene that the user is observing. A special human-machine interface system is able to translate gaze movements into requests by the end-user and translate this into actions that the robot can perform on scene objects.

SUMMARY OF THE INVENTION

According to some embodiments of the present invention, there is provided a method for defining a common coordinate system between robots and sensors in a given environment. The method comprises collecting a sequence of a plurality of images showing at least one sensor and/or one mechanical device with an internal coordinate system, such as a robotic arm, performing an analysis of the sequence of a plurality of images to identify the sensor or machine in the scene and to determine its relative position with regards to the sensor from where the sequence of images were collected, and creating dynamic functions and parameter matrixes required to transform any given coordinates from/to the generating sensor to/from the detected sensor or machine.

Optionally, the sequence of a plurality of images is collected by at least one depth map sensor.

Optionally, the sequence of a plurality of images is collected by at least one digital camera.

Optionally, the sensor detected in the image is an eye tracker placed in front of an end-user's eye.

Optionally, the generating sensor is an eye tracker with one or more users' eyes in its field of view.

Optionally, the detected machine is a robotic arm.

Optionally, the detected machine is an unmanned vehicle.

Optionally, the detection algorithm is adjusted to recognize robotic machines of different types, makes, and models.

Optionally, the generating sensor or the detected one is mounted on an end-user in order to determine the end-user's relative position with regards to one or more robots and/or sensors in the environment.

Optionally, the collection and analysis of sequences of images is performed dynamically on a video stream input.

Optionally, the collection and analysis is done on a sequence of depth-maps and it is performed dynamically on a depth map input stream.

Optionally, other objects are detected in the sequence of images or depth-maps, and their 2D or 3D coordinates are calculated relative to one or more sensors' or machines' coordinates systems and shared between them.

Optionally, a new virtual coordinate system is created and shared between the generating-images device and the rest of the sensors and/or machines detected on the images, or between the controllers of these devices.

Optionally, all the above is performed in parallel by analysing a sequence of a plurality of images collected from two or more sensors in the environment.

According to some embodiments of the present invention, there is provided an end-user interface for controlling one or more machines or robots to perform a given task required by an end-user. The end-user can control the robots' actions by moving his gaze to the direction of an object in the environment, then selecting through the interface a given object and the action to be perform on it/with it. The method comprises gathering gaze position data from a plurality of images collected from a sensor that has one or more end-users' eyes in its field of view, then enabling a selection capability of the given object by detecting either an eye blink of predetermined time length, or a predetermined gaze gesture, and highlighting the object on the screen for feedback purposes. Then, an option selection is enabled by showing a list of available actions on screen and allowing the end-user to scroll through them by directing his/her gaze in a given directions. Options are highlighted on screen as gaze movements are detected in the given direction. Finally, a selection capability is enabled by detecting the end-user's blink for a predetermined lapse of time, or by detecting a predetermined gaze gesture, while an option is highlighted on screen. A complementary external sensor or camera can optionally be used to determine the coordinates of the object selected with respect to the robotic arm and/or with respect to the end user's eyes. At this point, a processing unit transfers the coordinates of the selected objects to the robot, translated to coordinates that are relative to the robot itself and based on the first method described above. It also transfers the type of actions selected by the end-user to be performed by the robot on the object or with the object.

Optionally, instead of selecting an action to be performed on the object, the end-user can select in the same way the option of controlling the robot or robots movements through gaze. From this point on, and until deselecting this option, the robot will move proportionally in the same direction that the gaze detection algorithm identifies that the pupil or eye centre moved.

Optionally, instead of selecting an action to be performed on the object, the end-user can select in the same way an option of controlling the robots' movements through gaze in a "joystick-mode". From this point on, and until deselecting this option, the robot will move proportionally in the same direction that the gaze detection algorithm detects while the user's gaze is displaced beyond a predetermined pixels radius from a pre-calibrated home position.

Optionally, a scalar factor is used to calculate the proportional displacement in space to be performed by the robot with respect to the proportional displacement of the end-users' pupil.

Optionally, this scalar factor can be edited by the end-user, enabling him to change the distance that the robot will be displaced in space for each pixel displacement on a gaze detection track. This acts as a sort of virtual gear for the robot being controlled, where step movements can be increased or decreased by a scale factor.

Optionally, the scalar factor mentioned above is used to define a fix step that the robot will be displaced in the direction of the gaze displacement.

Optionally, a gaze-gesture recognition algorithm enables the end-user to indicate selections and actions. These gestures include, but are not limited to, vertical, horizontal and diagonal movements at certain speeds and with a displacement gap that is bigger than a predetermined threshold. Gestures also include detection of movements of gaze in circle-like trajectories in clock-wise and counter clock-wise directions.

According to some embodiments of the present invention, there is provided an apparatus associated with a multi-modal controller. The apparatus comprises at least one processing unit and one or more sensors of images and/or depth maps and/or sounds and/or voice and/or EEG and/or touch. The outputs of these sensors are analysed by the processing unit in order to detect one or more patterns on inputs from one or more sensors that are translated into one or more commands to the robot, to the processing unit or to other devices. A pattern learning mechanism is implemented by keeping history of outputs collected from those sensors, analysing any apparent pattern on these outputs and analysing time correlation between patterns recognized from each of the sensors. The end-user can then visualize those patterns and their interrelation, and define a command or sets of commands to be executed each time similar pattern combinations are detected in the future.

Optionally, patterns are detected by fitting geometrical shapes to trajectories created by tracking relative displacement of the end-users' eye centers. For example, detecting a circular type of movement, or linear type of movement and its direction.

Optionally, patterns are detected by fitting geometrical shapes to trajectories of other body parts such as finger tips, hands, head orientation and others.

Optionally, patterns are pre-recorded and used to identify end-users requests.

Optionally, a mechanical device such as a robot is connected to the controller. Commands detected trough the patterns system described above are translated into actions that this device will execute.

Optionally, other electrical devices such as lights, appliances or other electrical-powered artefacts are connected to the controller. Commands detected trough the patterns system described above are translated into actions that this device will execute.

Optionally, a predictive method is implemented that anticipates the pattern or combination of patterns to be generated by analysing partial history of sensors output. For example, if patterns were detected and defined based on a set of 50 consecutive images from an input video camera, or from a collection of images acquired during 5 seconds of video history, a prediction method is implemented to detect potential future pattern based on only last 20 consecutive images or on last 2 seconds of video history. If it's circular-like movement tracked from the end-users eye center position, detecting half circle on partial history track activates a prediction that translates into a predicted command corresponding to the circle-like type of shape in history tracking.

According to some embodiments of the present invention, there is provided an apparatus associated with at least one sensor. The apparatus comprises at least one spatial sensor for collecting a sequence of plurality of images, at least one processing unit which analyses a sequence of a plurality of images to identify other sensors, robots, end-users parts and/or objects, at least one processing unit which analyses a sequence of a plurality of images to identify the position of at least one additional sensor, end-user or robot, at least one storage unit to save the sequence of a plurality of images and the analysis results, at least one processing algorithm, the at least one coordinates conversion algorithm and parameters, and the at least one technical usage characteristic, at least one digital communication method to communicate the coordinates and conversion algorithms and parameters to the at least one associated robotic machine or other devices, at least one digital communication method to communicate the at least one technical usage characteristic to at least one statistical analysis system, and housing for containing the at least one spatial sensor, the at least one processing unit, the storage unit, and the communication method, the housing being configured for being suitable for the environment of the robotic machine in the cases where a robotic machine is included.

Optionally, the at least one spatial sensor consists of at least one depth map sensor.

Optionally, the at least one spatial sensor consists of at least one digital camera.

Optionally, the at least one digital communication method is any digital communication method typically or atypically used in the working environment of the associated at least one robotic machine, including, but not limited to, wired Ethernet, wireless Ethernet, serial communication standards, parallel communications standards, infrared communications, wired universal serial bus, wireless universal serial bus, Bluetooth communication, or any type of typical or atypical industrial automation protocol.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve detection of objects, sensors and/or machines manually, automatically, or a combination thereof. Moreover, according to actual instrumentation and equipment of embodiments of the method and/or system of the invention, several selected options could be implemented by hardware, software or firmware or by a combination thereof using an operating system.

For example, hardware for performing analysis tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF EMBODIMENTS OF THE INVENTION

According to some embodiments of the present invention, there is provided a method for defining a common coordinate system between robots and sensors in a given environment. The method comprises collecting a sequence of a plurality of images showing at least one sensor and/or one mechanical device with internal coordinate system, such as a robotic arm, performing an analysis of the sequence of a plurality of images to identify the sensor or machine in the scene and to determine its relative position with regards to the sensor from where the sequence of images was collected, creating a dynamic function and parameters required to transform any given coordinates from/to the generating sensor to/from the detected sensor or machine.

Optionally, the plurality of images are complemented by corresponding depth maps or other special correlating matrices. The analysis includes object recognition algorithms to detect the rest of the sensors and/or robots in the environment.

Optionally, special stickers or markers such as chessboards or barcodes or other recognizable IDs are placed over each of the sensors on the environment and/or over the robot's end points in order to facilitate these algorithms. Orthogonal unit vectors representing the axes of the objects coordinate system can be derived from these special stickers. They assist in describing the rotation of its coordinates with respect to the generating sensor.

Optionally, the stickers or markers above are placed on a skin section or sections of an end-user, or in clothes or devices worn by the end-user—in order to determine the end-users' relative position with regards to one or more robots and/or sensors in the environment.

Optionally, color segmentation can be used in each image in order to locate other sensors or mechanical devices. This will be useful in environments where colors of sensors and/or robots are not present in other objects.

Optionally, shape or contrast segmentation can be used where the shapes of robots and/or sensors are unique in the environment.

Optionally, a combination of the above can be used for segmentation purposes in determining the presence and location of other sensors and/or robots in the environment.

Figure 2:
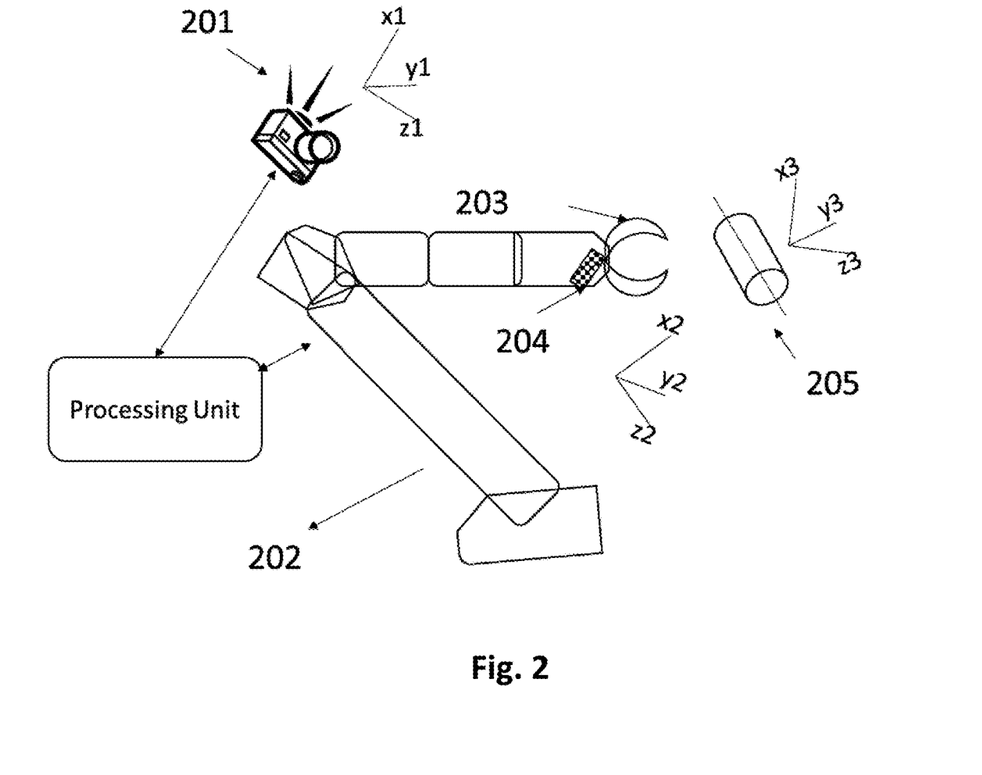
FIG. 2 is a schematic representation of a camera, robot and object to be manipulated. Illustrates how each object/device has its on pose and coordinates, which are shared and then processed to obtain common special coordinate system.

FIG. 2 shows a schematic illustration where the location and pose of the end point of the robot is detected by analysing the external camera's images or depth maps frames. Detection mechanism might be facilitated by adding a special graphic identifier to the robot's end-point (i.e. chess board sticker or printout, QR code other graphic signs) and/or might be detected directly by algorithms that identify and locate the robot's gripper or end-point. Additionally, coordination algorithms might be implemented to facilitate the process where the sensor locates the end-point in a given robot location, then the robot moves and again a detection and calculation is performed from an image on the new position. The figure includes:

201—External camera with robot arm and scene objects on field of view

202—Robotic arm

203—Robotic arm's gripper

Figure 6:
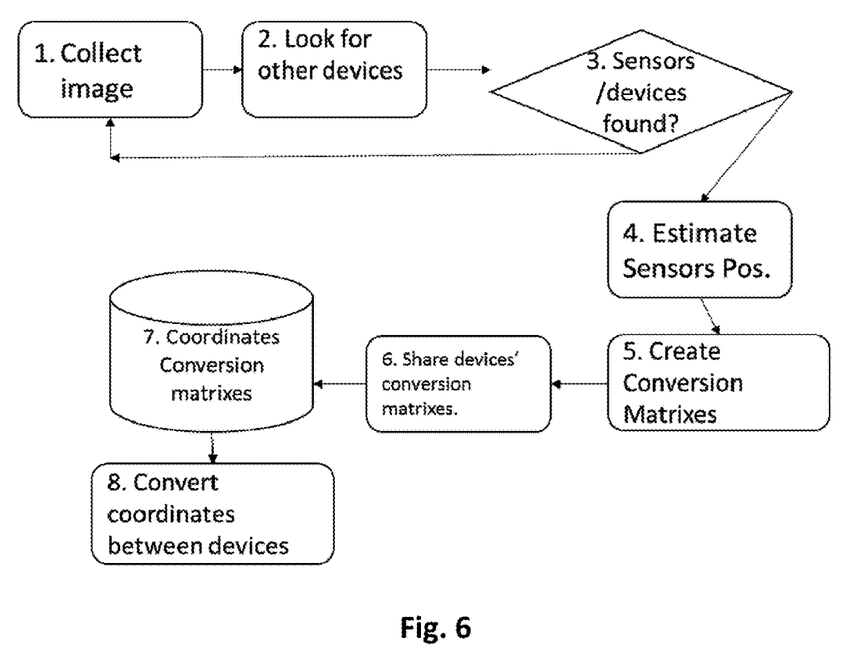
FIG. 6 is a schematic representation of the Dynamic Multiple-Devices Calibration work flow.

204—Special identifier of robotic end-point pose for location and identification by other sensors 205—Objects on scene to be manipulated by robot Reference is now made to FIG. 6, a flowchart of one embodiment described herein for clarification, according to some embodiments of the present invention. FIG. 6 shows an illustration of the workflow to perform for the multiple devices' and sensors' calibration. On an initial step (1), a collection of depthmaps, images and/or other spatial data are collected. On step 2, recognition algorithms are run over the frames collected from the sensors, which are read as BGR matrices and/or depth matrices and/or other type of sensing data matrices, to find other sensors in the field of view and/or mechanical devices such as robots. Search algorithms might be assisted by adding identifiable stickers on each sensor with an encoded ID. These stickers might be chessboard printouts, barcodes, actual letters and numbers that are recognized through OCR algorithms, or others. Once the corners of the chessboards are detected in step (4), vectors are constructed for x,y and z coordinates relative to the x,y,z coordinates 0,0,0 of the generating sensor. This matrix might include a parallel shift (i.e. x+xdisplacement, y+ydisplacement, z+displacement) and/or a rotational angle displacement (i.e. degrees of rotation for x coordinate with respect to x coordinate of generating sensor, degrees of rotation for y and degrees of rotation for z). This information is stored and used anytime (step 8) an object is detected by any of the sensors and it needs to be translated to coordinates of another sensor in the environment or a robot or mechanical device.

On an initial step (1), a collection of depth maps, images and/or other spatial data are collected. On step (2), algorithms are run over the matrices collected to find other sensors in the field of view and/or mechanical devices such as robots. Search algorithms might be assisted by adding identifiable stickers on each sensor with an ID encoded. These stickers might be a chessboards printout, barcodes, characters and numbers that can be identified through OCR algorithms or other uniquely identifiable signs. Once the corners of the corners of the chessboard are detected in step (4), vectors are constructed for x, y and z coordinates relative to x,y,z coordinates 0,0,0 of the generating sensor. This matrix might include a parallel shift (i.e. x+xdisplacement, y+ydisplacement, z+zdisplacement) and/or a rotational angle displacement (i.e. degrees rotation for x coordinate with respect to x coordinate of generating sensor, degrees rotation for y and degrees rotation for z). This information is stored and used on demand (step 8) each time an object is detected by any of the sensors and it needs to be translated to coordinates of another sensor in the environment or a robot or mechanical device.

Once a sensor is detected and its position determined with respect to the generating sensor—the one from which the images where collected—, a conversion matrix is built to allow the transformation of coordinates from one device to and from the other. This is done by calculating a parallel shift of each axis (x,y,z in 3D or x,y in 2D), and calculating rotation angles and direction for each of these axis. The parallel shift and rotation angles' parameters are saved and used to transform coordinates between sensors and/or machines in the environment. For example, if a sensor detects an object, it will determine the x,y,z coordinates of the object within the sensors' coordinate system (where usually the sensor's position is 0,0,0 in its coordinate system). Then, when a robot is required to perform an action on this object, a transformation of coordinates of the object is performed towards the coordinate system of the robot itself. This transformation typically utilizes knowledge of the relationship between the sensor and the robot.

Optionally, the matrixes and/or parameters mentioned above describe a single rotation about some axis according to Euler's rotation theorem, using three or more real numbers.

Optionally, quaternions are used to represent the translation and rotation of the detected sensor and/or mechanical device with respect to the generating sensor.

For example, analysis of a frame 0 of a video-stream+depth map of a given sensor can identify the location of a second sensor, a gripper, robotic arm end-point or other devices on the scene. A rotation unit quaternion is calculated based on, for example, three given points that are co-planar to the detected device. Then, the detected device shares its 3D location based on its own 3D coordinate system. For example, a robotic arm can share where the end-point is located according to its own XYZ coordinate system and can also share the rotation of the end point represented as a rotation angle around each of its base axes. A later frame will again detect the position of these three points in the generating sensor's coordinate system. If the position of one or more of these points changed according to the generating sensor's coordinate system, the processing unit can estimate the rotation and translation of the robotic end point with respect to the previous location on robot coordinates by calculating Q×P×Conjugate of Q. Q being the inverse quaternion of the rotation quaternion defined by the three robot end-point points detected in the previous frame with respect to the planes of the sensor, normalized as a unit quaternion and P being the quaternion that represents the delta displacement from previous frame to current frame. The resulting matrix is used to increase/decrease each robot axis coordinate value, shared in previous frame, in order to know the robot equivalent coordinates to the camera/sensor ones. The rotation of the endpoint in robot coordinates is calculated by robQ×CamQ, where robQ is the unit quaternion representing the robot endpoint rotation in the original frame, expressed in robot coordinate system as rotations around each of its base axes, and CamQ is the unit quaternion representing the delta rotation of the three detected points with respect to the previous frame in camera coordinates. Pre-equivalence between axes might be setup by end-user by defining, for example, that X axis coordinate in the sensor's coordinate system will be equivalent to Z axis in the robot coordinate system.

Optionally, the method described above can be used to dynamically and without user intervention, calibrate a robotic gripper and one or more cameras in the environment.

Optionally, the method described above can be used to control a robotic arm and bring its gripper and/or endpoint to a given location and in a given rotation calculated based on the camera or camera's coordinate system. In this case, instead of determining the location and rotation from identification of the gripper points in a later frame, these points are calculated according to the processing unit software in the sensors' coordinate system and the method above is used to convert these sensor coordinate values into robot coordinate values.

Figure 1:
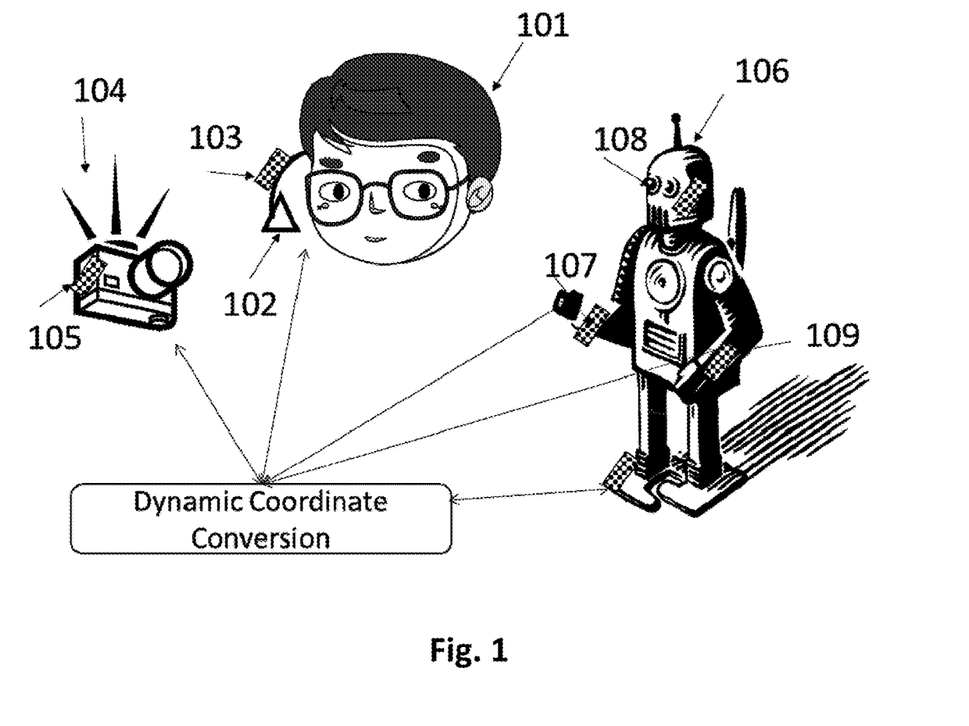
FIG. 1 is a schematic representation of the dynamic coordinate conversion system between devices. Illustrates an end user equipped with an eye-tracking camera, EEG and microphone, robot and external cameras.
Figure 5:
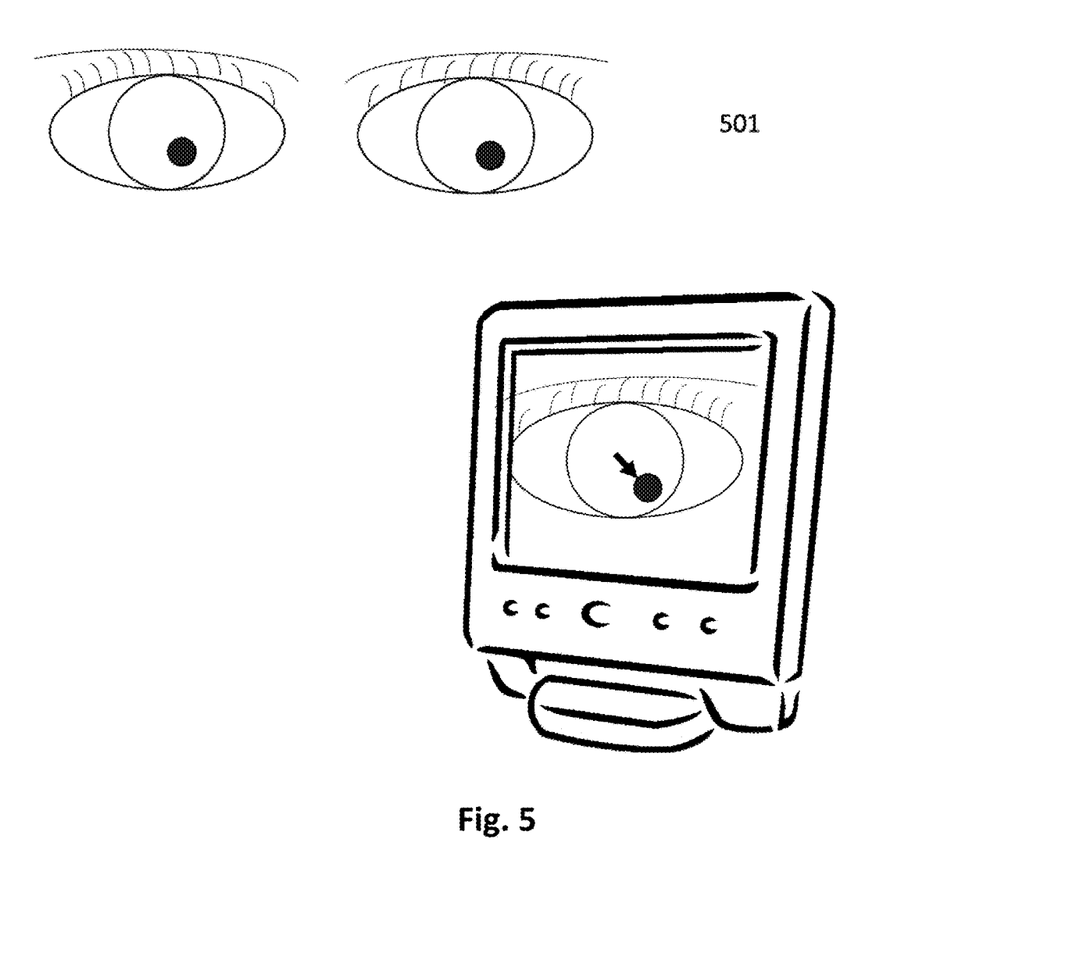
FIG. 5 is a schematic representation of the feedback on screen to end-user on gaze control and gesture recognition

According to some embodiments of the present invention, there is provided an end-user interface for controlling one or more machines or robots or electrical devices to perform a given task required by an end-user. See FIG. 1 for illustration. FIG. 1 is a schematic representation of a multi-sensor environment where an end-user selects objects through gaze and requests actions to be performed by a robot arm. The illustrated system calculates a unified coordinate system between all the devices in a dynamic way, enabling each of these devices to know the relative position of the other devices in a given scene. This is accomplished by either creating a new universal coordinate system to which and from which any device can map its own location and the locations of the other devices. On an alternative mechanism, there is a device selected as "master". Every device can map its own location and the locations of other devices through an intermediate conversion to the master device coordinates. The identification of each of the sensors and/or machines in the environment is assisted, in this particular illustration, by adding chessboard signs or other graphic signs that are recognized by image detection algorithms and from which a spatial position can be derived (x,y or x,y,z). Other unique visual signs can be used instead. FIG. 1 shows:

101—End user
102—Eye tracker sensor or camera, visually identifiable from external sensors such as the sensor (5) in illustration
103—Special graphical identifier for unique object pose and location identification by other devices
104—External camera or sensor with other devices in its field of view
105—Robot with any combination and quantities of arms, legs, wheels and other actuators and sensors
106—Cameras or sensors mounted on robot The end-user can control the robots' actions by moving his gaze to the direction of an object in the environment, then selecting through the user interface a given object and the action to be perform on it/with it. The method comprises gathering gaze position data from a plurality of images collected from a sensor that has one or more end-users' eyes in its field of view, and position data from one or more sensors in the environment where the object and the end-user's gaze tracking device are at least at one of their fields of view, then enabling a selection capability of the given object by detecting either an eye blink of predetermined time length, or a predetermined gaze gesture, and highlighting the object on the screen for feedback purposes. Then, an option selection is enabled by showing on screen to the end-user a list of available actions and allowing the end-user to scroll through them by directing his/her gaze in a given direction or using any other pointing computing device. Options are highlighted on screen in response to detected gaze movements in the given direction. Finally, a selection capability is enabled by detecting the end-user's blink for a predetermined length of time, or by detecting a predetermined gaze gesture in the tracking history of the end-user's pupil's center, while an option is highlighted on screen. Optionally, at this point, a processing unit transfers the coordinates of the selected objects to the robot, converted to coordinates that are relative to the robot itself and based on the first method described above. It also transfers the type of actions selected by the end-user to be performed by the robot on the object or with the object. FIG. 5 illustrates the kind of feedback the end-user is presented with in order to let him know the direction the mechanical device will move to and the amount of displacement selected. In a joystick-type of control, the robot will move equal distances in periodic lengths of time in the direction selected. When the eye is back to its centre, the robot will stop moving. An arrow highlighting direction and displacement gap is optionally displayed on the screen in order to let the end-user know his current selection. Optionally, images from sensors on the environment or placed on the robot's end point will be overlapped on top of the eye location image, or either of them will be displayed alone.

Optionally, the end-user's pupil home position is set by enabling the end user to select the "set home position" option while the pupil is detected in certain image position.

Optionally, the end-user's pupil home position is set automatically by keeping track of the pupil's position on the images at the initial stage and for a given length of time, and making an average of where the pupil was detected on the image matrix (i.e. BGR matrix retrieved from sensor).

Optionally, gaze gestures are detected by keeping a history of the pupil's centre coordinates for the last set of images or for a given length of time, in a dynamic way.

Optionally, pupil's trajectories that are detected as being similar to an ellipse or a circle by,—for example—using fitEllipse function or HoughCircles function of OPENCV library, and that are moving in a clockwise direction, are interpreted as increase command or as scrolling command in one direction.

Figure 3:
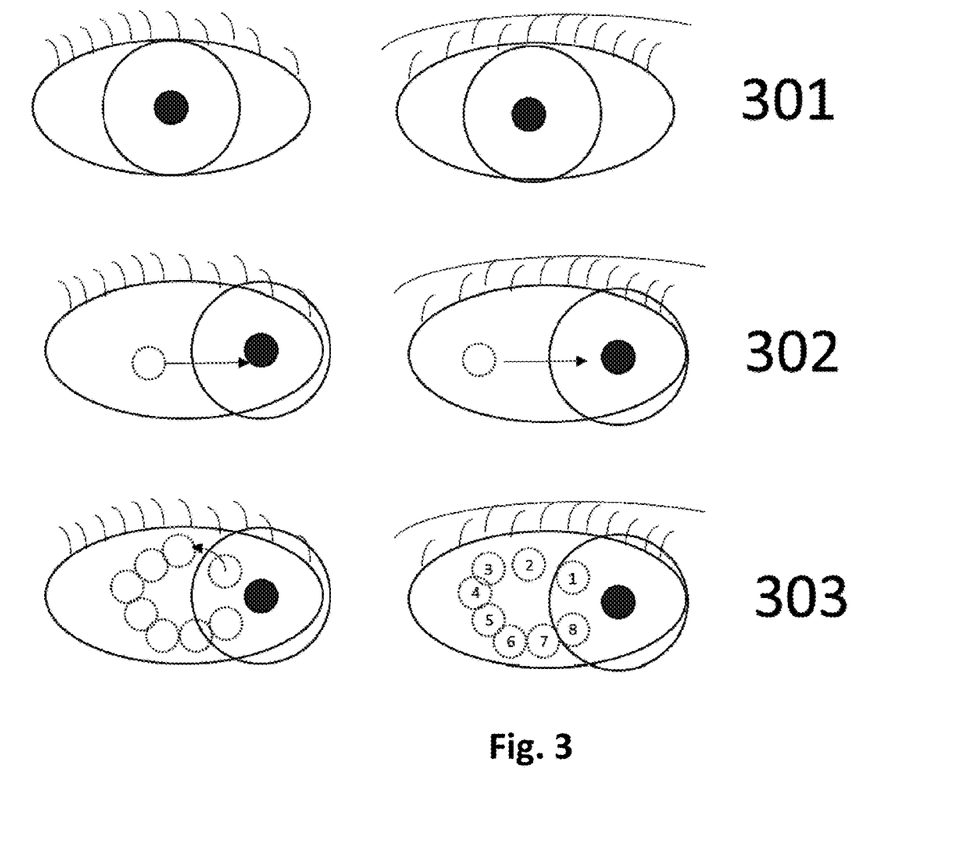
FIG. 3 is a schematic representation of pattern recognition of gaze gesture.

Optionally, pupil's trajectories that are similar in shape to a circumference and moving in non-clockwise direction are interpreted as a decrease command or as a scrolling command in the one direction. FIG. 3 illustrates this scenario. FIG. 3 is a schematic representation of three different locations of pupils detected by looking for dark circle-like patterns within a predetermined range of diameters. The locations and gestures detected are translated into end-user selections and/or robotic movements.

301—Pupils are detected by searching for circle-like dark shapes that fit within predetermined diameter limits. Pupils' home positions are set.

302—Pupil displacement is calculated by detecting pixel differences between home position pupil's center and current image pupil's center. Direction and pixel displacement are translated into a robot movement direction and distance to be performed. Movement speed is calculated by detecting the pixel displacements of the centers on each image and using the timestamp of each of the image frames used.

303—Gaze gestures are recognized by keeping a history of the pupil's center detected through multiple frames, and analyzing trajectory shapes. In this illustration, a counter-clock circle type of trajectory is detected after several sequential images are analyzed and the pupil center in each of them is detected.

A home position is set in 301. In 303, circles 1 to 8 illustrate the positions where the pupil was tracked in the last 8 frames. An ellipse type of shape and a counter-clock direction is detected in the tracked history.

Optionally, pupil's trajectories that are similar in shape to straight lines are interpreted as scrolling command in that direction.

Optionally, using selection options described above, an end-user can increase or decrease the distance that the robot will move for each step. This will work as a virtual-gear, where a given pixel displacement of the pupil's centre is translated into a given spatial displacement of the robot's end point multiplied or divided by a factor that the end-user selects.

Optionally, using selections options described above, an end-user can increase or decrease the distance that a cursor on screen will move to indicate each step. This will work as a virtual-gear, where a given pixel displacement of the pupil's centre is translated into a given spatial displacement of the cursor on screen multiplied or divided by a factor that the end-user selects.

Optionally, a camera is placed on a mechanical device and/or robot. The direction of the pupil's movement is translated into movements that the mechanical device performs in the same direction. The images from this camera are then transferred back to the end-user. This enables the ability to explore an environment visually by moving the pupil towards the direction where the end-user wants to expand and explore. If the end-user, for example, moves his gaze rightwards far from the pupil's home position, then the mechanical device will move rightwards and images of the camera mounted on it will be transmitted showing an additional portion of the environment towards the right of the previous field of view.

Figure 7:
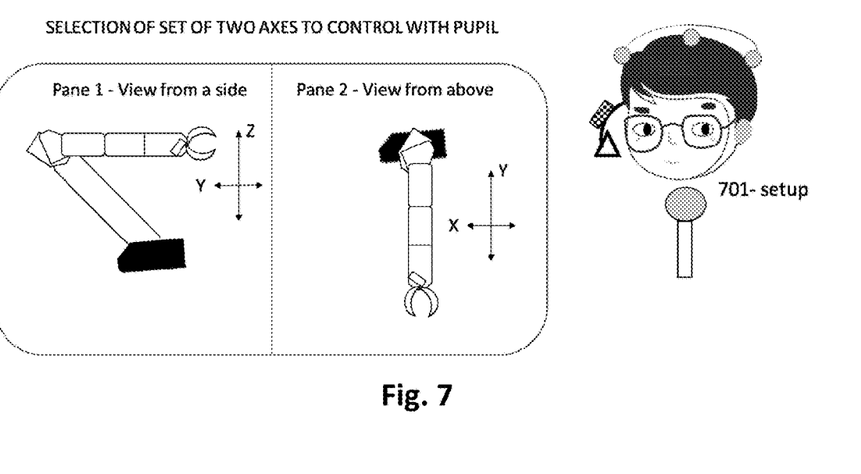
FIG. 7 is a schematic representation of selection between sets of two axes in order to control robot or other mechanical devices with gaze.

Optionally, when controlling a robot with gaze an end user can switch between sets of coordinates and see on screen the robot and optionally the object being moved by retrieving images of another sensor that offers this image. This is illustrated in FIG. 7. This figure illustrates the ability of an end-user to switch between sets of two axes in order to control the robot with gaze. By moving between panes shown on screen, as the ones in the figure, the end user can, for example, translate x,y of its gaze coordinates to y,z of the robot or to y,x of robot, or to any other sets of two coordinates. For example, around a robotic arm, two cameras can be placed—one with a view of the robot from above and one with a lateral view of the same robot. The end user can switch between them with gaze selection or other means, and can control the robot in different sets of 2D coordinates. For example, from above it could control the robot's x, y coordinates while from the side it could control the robot's y, z coordinates.

Optionally, an option is enabled to the end-user through gaze gestures allowing him to switch between sets of 2D coordinates of a given mechanical device, and then control with gaze that device on those target coordinates, with or without visual feedback from sensors around that device. See FIG. 7.

Figure 8:
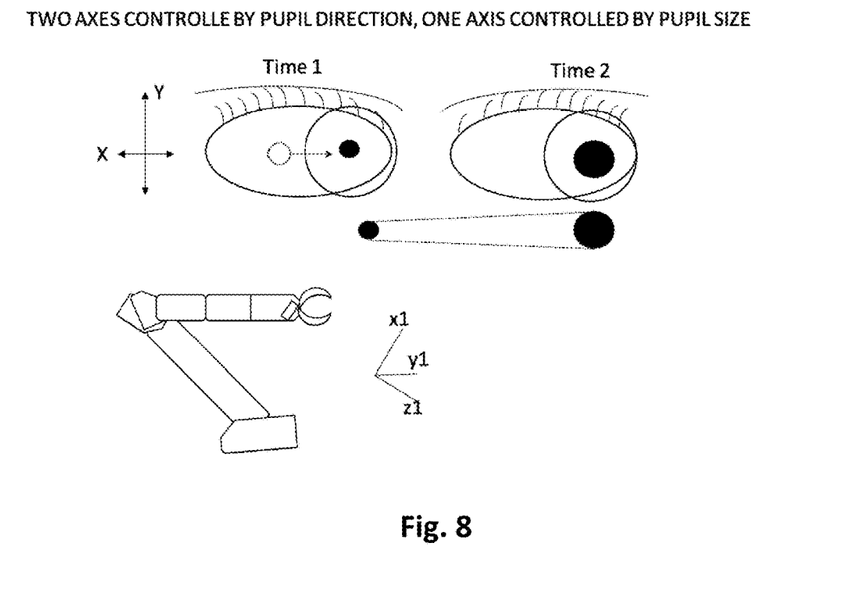
FIG. 8 is a schematic representation of 3 axes being controlled through gaze, one of the axes being defined by variation in pupil diameter in time.

Optionally, a 3D coordinate system is implemented where x,y coordinates are obtained from the row and column of the detected pupil's center in the image, while the z coordinate is calculated based on the diameter of the pupil detected or its relative variations. See FIG. 8 for an illustration of this scenario. This figure illustrates a method where the pupil's trajectory direction on screen controls the robots movements in two coordinates, while a third coordinate is controlled by calculating the difference in pupil's diameter. Detecting difference in diameter of pupils, in time, a Z displacement is calculated for robot or a more/less distant object Is selected in the same X,Y line of view. X,Y of robot is calculated based on X,Y displacement of pupil on captured images. Same approach can be used to locate an object that the end-user is looking at or wants to select.

Optionally, the pupil diameter change is used to calculate a spatial difference for one of the coordinate axis. For example, increase/decrease on pupil's diameter can be interpreted as increase/decrease in z coordinates.

Optionally, x,y coordinates on screen are compensated for the 3D circularity of the users' eyeball.

Optionally, an axis of eye pupil can be transformed to a different axis on the robot or machine to be controlled by a selection of the end-user.

According to some embodiments of the present invention, there are provided methods and devices for robotic machine task learning through recording and reproduction of end-users' commands through one or more selection method described above. End-users commands are stored sequentially or in parallel and then replicated on demand.

Optionally, an option is enabled to allow the end-user to save the robot's current position in any given time on its local coordinates system, and create a robot trajectory between the saved positions that can be ran later on by request of the end-user selection.

Optionally, the controller analyses the direction where the end-user is looking in the environment, then through the coordinates transformation system described above, identifies this object's location from the point of view of an external sensor. Then these coordinates are converted to any of the devices' or sensors' coordinates systems for future actions.

According to some embodiments of the present invention, there is provided an apparatus associated with a robotic controller. The apparatus comprises at least one processing unit and one or more sensors of images and/or depth maps and/or sounds and/or voice and/or EEG and/or and/or touch. The outputs of these sensors are analysed by the processing unit in order to detect one or more patterns on inputs from one or more sensors that are translated into one or more commands to the robot, to the processing unit or to other devices. A pattern learning mechanism is implemented by keeping history of outputs collected from those sensors, analysing any apparent pattern on these outputs and analysing time correlations between patterns recognized from each of the sensors. The end-user can then visualize those patterns and their interrelation, and define a command or sets of commands to be executed each time similar pattern combinations are detected in the future.

Optionally, sensors connected to the controller produce raw data such as bit-map images, EEG signals per channel and sound.

Optionally, one or more devices connected to the controller produce pre-processed data. For example, an Emotiv EEG device pre-detects certain commands based on EEG channels, and/or Primesense's sensors identify gestures and produce notifications of these gestures and/or cellphone devices are able to recognize words pronounced by the end-user. The proposed controller then takes these inputs into account and produces a combined pattern that is later used by the end-user to generate a command or sets of commands. If the word "Do" is detected by the cellphone just after a particular command was detected at the EEG emotive device and just before the end-user created a given gaze signal, a new pattern is defined and the end-user can associate a command to this pattern. Optionally, each time the same sequence of events is recognized the controller will perform the selected command.

Figure 4:
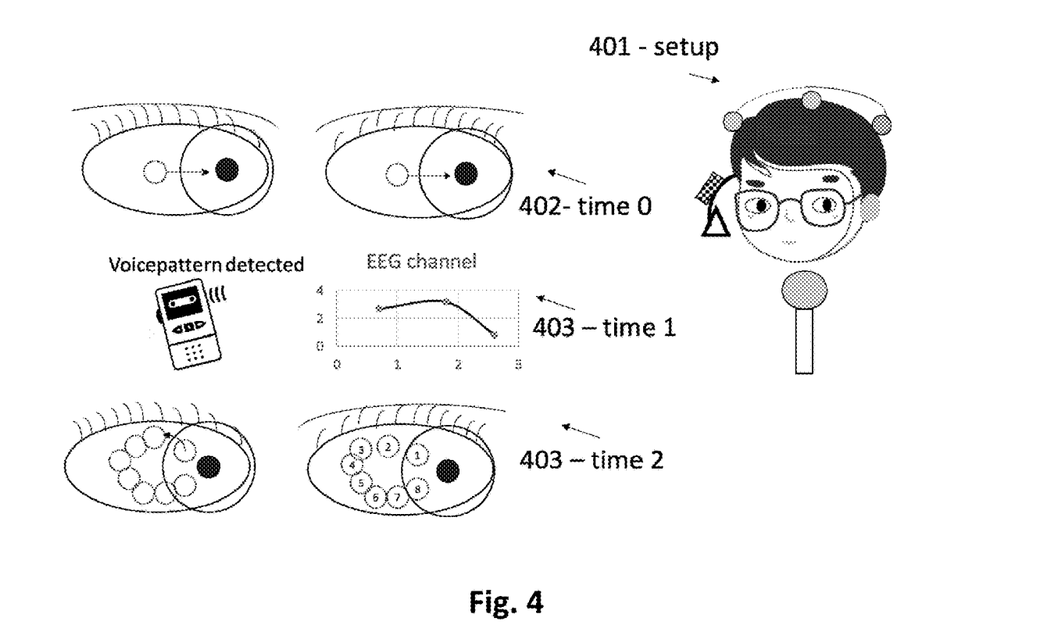
FIG. 4 is a schematic representation of end-user requesting commands through a combination of voice, gaze, EEG patterns.

Optionally, patterns are detected by fitting geometrical shapes to trajectories created by tracking relative displacement of the end-users' eye centres. For example, detecting a circular type of movement, or linear type of movement and its direction. fitEllipse HoughCircles function of OpenCV can be used in order to enable this option, by running them on the backward recorded positions. This tracking mechanism records to memory or disk the position where the centre of the pupil or eyes was detected in each frame and the time when the frame was acquired, among other useful data. The history buffer is pre-set to store a pre-defined set of eye center positions. Optionally, the history buffer is set by a pre-defined time period. For example, detected centre of eyes are recorded and analysed dynamically for the last 10 seconds with regards to the current frame. A FIFO queue is implemented for these records. FIG. 4 is an illustration of multiple patterns recognized from multiple sensors in a sequential way. An end-user is equipped with an EEG device such as EMotiv, an eye tracker such as a glass mounted CMOS IR illuminated micro camera and a microphone or sound input device (401). In some cases the sound input device can be a cellphone. A detecting pattern algorithm runs on the controller of these devices and detects a sequence of patterns between time 0, time 1 and time 2. On time 0 (402), an eye movement was detected towards the right, on time 1, a voice signal was detected and recognized—optionally—as a voice command while in parallel a decrease in one of the EEG channels signal was detected, and on time 2 a circular gesture was detected while tracking the eye pupil's centre. Partial or complete combinations of these detected patterns are presented to the e-end user and can be associated with specific commands in future actions enabling this way a learning mechanism of combination of gestures by end user from multiple sensors. These commands can be an action on a robot, controlling light or other electrical devices or selecting options on a computer screen for example.

Optionally, the end-user's eye center is detected by fitting an ellipse of predefined minimum and maximum diameter to darker areas of an image collected from sensors that is located close to the end-user's eye. Using an IR illuminated black and white CMOS camera or equivalent, for example, the pupil will be the darkest section on the image.

Optionally, patterns are detected by fitting geometrical shapes to trajectories of other body parts such as finger tips, hands, head orientation and others.

Optionally, patterns are pre-recorded and used to identify end-users' requests.

Optionally, a mechanical device such as a robot is connected to the controller. Commands detected through the patterns system described above are translated into actions that this device will execute.

Optionally, other electrical devices such as lights, appliances or other electrical-powered artefacts are connected to the controller. Commands detected through the patterns system described above are translated into actions that this device will execute.

Optionally, a predictive method is implemented that anticipates the pattern or combination of patterns to be generated by analysing partial history of sensors' output. For example, if patterns were detected and defined based on a set of 50 consecutive images from an input video camera, or from a collection of images acquired during 5 seconds of video history, a prediction method is implemented to detect potential future pattern based on only last 20 consecutive images or on last 2 seconds of video history. If it's circular-like movement tracked from the end-users eye center position, detecting half circle on partial history track activates a prediction that translates into a predicted command corresponding to the circle-like type of shape in history tracking.

Optionally, the methods and embodiments described above are used as a system to assist physically impaired patients who can demand actions from a robot combining one or more gesture mechanisms: Eye gaze, voice, gestures, EEG signals, touch, and others.

Optionally, the methods and embodiments described above are used to control a robot remotely through the Internet or other communication means.

Optionally, the methods and embodiments described above are used to create a semi-automatic robotic system where the end-user highlights objects on the screen based on images collected from the system's sensors, offering feedback on the objects identified and their locations.

What is claimed is:

1. A method for generating a common coordinate system between robotic devices and sensors in a given environment comprising:
    providing at least one processing unit, a first sensor and a second sensor, and at least one robotic device;
    collecting a sequence of images from said first sensor showing said second sensor and said robotic device;
    analyzing said sequence of images to uniquely identify said second sensor and said robot device and their relative location and pose;
    generating a set of conversion parameters for permuting said relative location to location data relative to at least one of said second sensor and said robotic device, wherein said second sensor is a gaze tracker.

2. The method according to claim 1, wherein said first sensor is a digital camera.

3. The method of claim 1, wherein said first sensor is a depth sensor.

4. The method according to claim 3, wherein collecting a sequence of images comprises collecting a depth mapping input stream, and wherein identifying said relative location and pose is performed dynamically on said depth map input stream.

5. The method according to claim 1, wherein determining the relative location and pose further comprises determining coordinates of additional objects detected in said sequence of images.

6. The method according to claim 1, wherein determining the relative location comprises determining coordinates of objects relative to said robotic device.

7. The method of claim 1, wherein said robotic device includes a gripper mounted on a robot end point.

8. The method of claim 7, wherein determining the relative location and pose of said robotic device comprises determining a relative location and pose of said gripper with respect to at least one of said first and said second sensor.

* * * * *